US008961660B2

(12) United States Patent
Ogawa

(10) Patent No.: US 8,961,660 B2
(45) Date of Patent: Feb. 24, 2015

(54) CANISTER ARRANGEMENT STRUCTURE, FUEL VAPOR RECOVERY DEVICE, AND VEHICLE EQUIPPED WITH FUEL VAPOR RECOVERY DEVICE

(75) Inventor: Yoshihide Ogawa, Anjo (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 149 days.

(21) Appl. No.: 13/088,834

(22) Filed: Apr. 18, 2011

(65) Prior Publication Data

US 2011/0252972 A1 Oct. 20, 2011

(30) Foreign Application Priority Data

Apr. 20, 2010 (JP) ................................ 2010-097012

(51) Int. Cl.

| | |
|---|---|
| ***F02M 33/02*** | (2006.01) |
| ***B01D 59/26*** | (2006.01) |
| ***F02M 25/08*** | (2006.01) |

(52) U.S. Cl.

CPC .................................. *F02M 25/089* (2013.01)
USPC .............................. 96/108; 123/518; 123/519

(58) Field of Classification Search

CPC ........ F02M 25/08; F02M 33/08; B60K 15/03
USPC ........................................ 123/518, 519, 520
See application file for complete search history.

(56) References Cited

U.S. PATENT DOCUMENTS

| | | | | | |
|---|---|---|---|---|---|
| 4,393,817 | A * | 7/1983 | Lindberg | ......................... | 123/3 |
| 5,687,697 | A * | 11/1997 | Ishikawa | ...................... | 123/520 |
| 6,105,708 | A * | 8/2000 | Amano et al. | ................ | 180/309 |
| 6,588,202 | B1 * | 7/2003 | Mirochnitchenko et al. | ... | 60/286 |
| 7,237,644 | B2 * | 7/2007 | Matsumoto et al. | .......... | 180/309 |
| 7,261,092 | B1 * | 8/2007 | Oku et al. | ..................... | 123/516 |
| 7,367,324 | B2 * | 5/2008 | Izutani et al. | ................ | 123/509 |
| 7,444,996 | B2 * | 11/2008 | Potier | .......................... | 123/519 |
| 7,681,557 | B2 * | 3/2010 | Kim | ............................. | 123/519 |
| 8,418,794 | B2 * | 4/2013 | Shibata et al. | ............... | 180/219 |
| 2003/0217739 | A1 * | 11/2003 | Saeki et al. | .................. | 123/543 |
| 2005/0211496 | A1 * | 9/2005 | Ito et al. | ........................ | 180/314 |
| 2006/0037584 | A1 * | 2/2006 | Imamura | ....................... | 123/472 |
| 2007/0295313 | A1 * | 12/2007 | Amano et al. | ............... | 123/520 |
| 2010/0243358 | A1 * | 9/2010 | Suzuki | ......................... | 180/219 |

FOREIGN PATENT DOCUMENTS

| | | | |
|---|---|---|---|
| DE | 4140090 | A1 | 6/1993 |
| JP | 56-53971 | A | 5/1981 |
| JP | 05-012240 | U | 2/1993 |
| JP | 08-230493 | A | 9/1996 |
| JP | 2009-156031 | A | 7/2009 |
| JP | 2009-216078 | A | 9/2009 |

OTHER PUBLICATIONS

Chinese Office Action dated Dec. 13, 2012 of application CN 201110104228.1 and partial English translation of the same.
Espacenet, English-language abstract of DE4140090, Jun. 1993.
English-language machine translation of DE4140090, Jun. 1993.

* cited by examiner

*Primary Examiner* — Robert Clemente
*Assistant Examiner* — Joubert X Glover
(74) *Attorney, Agent, or Firm* — Kenyon & Kenyon LLP

(57) ABSTRACT

A canister arrangement structure in a fuel vapor recovery device includes a canister that has built therein an adsorbent for adsorbing fuel and temporarily collects fuel vapor generated in a fuel tank of an internal combustion engine, the canister is arranged between an exhaust pipe of the internal combustion engine and the fuel tank.

3 Claims, 6 Drawing Sheets

CANISTER ARRANGEMENT STRUCTURE, FUEL VAPOR RECOVERY DEVICE, AND VEHICLE EQUIPPED WITH FUEL VAPOR RECOVERY DEVICE

INCORPORATION BY REFERENCE

The disclosure of Japanese Patent Application No. 2010-097012 filed on Apr. 20, 2010, including the specification, drawings and abstract is incorporated herein by reference in its entirety.

BACKGROUND OF THE INVENTION

1. Field of the Invention

This invention relates to a canister arrangement structure in a fuel vapor recovery device that treats fuel vapor generated in a fuel tank after temporarily collecting the fuel vapor into a canister, the fuel vapor recovery device, and a vehicle equipped with the fuel vapor recovery device.

2. Description of the Related Art

In a fuel tank in which liquid fuel is stored, fuel vaporizes from a liquid surface of the fuel stored in the fuel tank, so that fuel vapor is generated in the fuel tank. A vehicle mounted with an internal combustion engine or the like is mounted with a fuel vapor recovery device that introduces fuel vapor generated in a fuel tank into an intake passage of the internal combustion engine during the operation of the engine and burns the fuel vapor.

In this fuel vapor recovery device, the fuel vapor generated in the fuel tank is introduced into a canister to be temporarily adsorbed by an adsorbent built in the canister. Then, during the operation of the engine, purge is carried out to suck out air in the canister to the intake passage with the aid of a negative pressure produced in the intake passage of the internal combustion engine and introduce air into the canister from an atmosphere introduction passage. Due to this purge, the fuel adsorbed by the adsorbent is desorbed from the adsorbent and introduced into the intake passage together with air. The fuel desorbed from the adsorbent is burned in the internal combustion engine.

That is, according to the fuel vapor recovery device as described above, the fuel vapor generated in the fuel tank can be removed through combustion without being discharged to the atmosphere. It should be noted that from the standpoint of promoting the desorption of fuel from the adsorbent, it is desirable to warm the adsorbent during purge. Thus, in a vehicular fuel vapor recovery device described in Japanese Patent Application Publication No. 8-230493 (JP-A-8-230493), a canister is arranged in a space surrounded by an exhaust pipe and a side member and a cross member, which constitute a frame of a vehicle, to warm an adsorbent with the aid of the heat of exhaust gas flowing through the exhaust pipe.

When this construction is adopted, the adsorbent can be warmed with the aid of the exhaust gas flowing through the exhaust pipe, and the desorption of fuel from the adsorbent can be promoted.

Incidentally, the canister and the fuel tank are connected to each other by a pipeline. Therefore, in the case where the canister is arranged close to the exhaust pipe and the adsorbent built in the canister is warmed with the aid of the heat of the exhaust gas flowing through the exhaust pipe as described above, the fuel tank and the exhaust pipe are arranged relatively close to each other.

When the fuel tank is arranged close to the exhaust pipe, the heat of the exhaust gas flowing through the exhaust pipe warms the fuel tank. When the fuel tank is warmed and the temperature of the fuel stored in the fuel tank rises, fuel vigorously vaporizes in the fuel tank, and a large amount of fuel is adsorbed by the adsorbent. As a result, the adsorbent is likely to be saturated, and the fuel vapor that cannot be adsorbed by the adsorbent directly flows through the canister to be discharged to the atmosphere from the atmosphere introduction passage.

It should be noted that by providing a canister equipped with a large-capacity adsorbent as well, the adsorbent can be restrained from being saturated. However, when such a construction is adopted, the canister is increased in size and leads to an increase in the size of the fuel vapor recovery device.

Thus, in order to effectively restrain fuel vapor from being discharged to the atmosphere while restraining the canister from being increased in size, it is desirable to restrain the fuel tank from being warmed by the heat of the exhaust gas flowing through the exhaust pipe.

It should be noted that the fuel tank can also be restrained from being warmed while warming the canister, by arranging the fuel tank at a distance from the exhaust pipe while arranging the canister close to the exhaust pipe. However, when this construction is adopted, the pipeline connecting the fuel tank and the canister to each other is long. Further, the space in which the fuel tank and the exhaust pipe can be arranged is limited. In some cases, therefore, a sufficient distance cannot be ensured between the fuel tank and the exhaust pipe.

SUMMARY OF THE INVENTION

The invention provides a canister arrangement structure, a fuel vapor recovery device, and a vehicle equipped with the fuel vapor recovery device that can restrain a fuel tank from being warmed by the heat of exhaust gas flowing through an exhaust pipe while warming an adsorbent built in a canister with the aid of the heat of the exhaust gas flowing through the exhaust pipe.

An aspect of the invention relates to a canister arrangement structure in a fuel vapor recovery device. The fuel vapor recovery device is equipped with a canister that has built therein an adsorbent for adsorbing fuel and temporarily collects fuel vapor generated in a fuel tank of an internal combustion engine. In this canister arrangement structure, the canister is arranged between an exhaust pipe of the internal combustion engine and the fuel tank.

According to the aforementioned construction, the heat radiated from the exhaust pipe and the heat transferred from the exhaust pipe side via air are blocked by the canister. Therefore, the fuel tank can be restrained from being warmed by the heat of the exhaust gas flowing through the exhaust pipe. Further, the canister is warmed by the heat radiated from the exhaust pipe and the heat transferred from the exhaust pipe side via air.

Thus, according to the aforementioned construction, the fuel tank can be restrained from being warmed by the heat of the exhaust gas flowing through the exhaust pipe while warming the adsorbent built in the canister with the aid of the heat of the exhaust gas flowing through the exhaust pipe.

BRIEF DESCRIPTION OF THE DRAWINGS

The foregoing and further features and advantages of the invention will become apparent from the following description of example embodiments of the invention with reference to the accompanying drawings, wherein like numerals are used to represent like elements and wherein.

DETAILED DESCRIPTION OF EMBODIMENTS

First Embodiment

A first embodiment of the invention in which a canister arrangement structure according to this invention is embodied in a fuel vapor recovery device mounted on a vehicle will be described hereinafter with reference to FIGS. 1 to 3.

Figure 1:
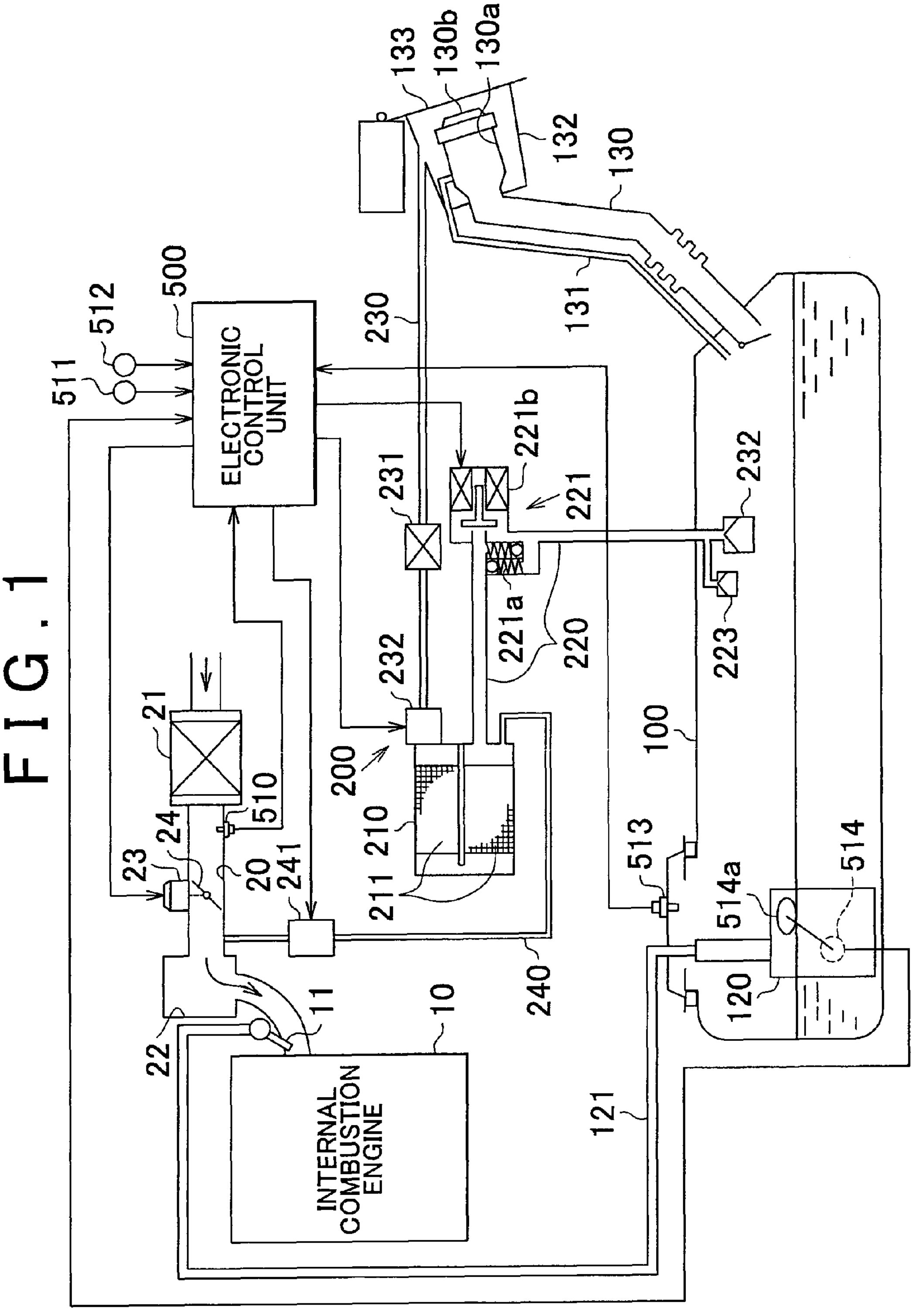
FIG. 1 is a schematic view showing an overall construction of a fuel vapor recovery device according to the first embodiment of the invention.

FIG. 1 shows an overall construction of a fuel vapor recovery device 200 according to this embodiment of the invention. As shown in a lower region of FIG. 1, a fuel tank 100 is provided with a pump module 120 that pumps up fuel stored in the fuel tank 100. Further, the fuel tank 100 is provided, in an upper portion thereof, with a pressure sensor 513 that detects a pressure in the fuel tank 100.

The pump module 120 is connected to a fuel injection valve 11 of an internal combustion engine 10 via a fuel supply pipe 121. Thus, the fuel pumped up from the fuel tank 100 by the pump module 120 is supplied to the fuel injection valve 11 through the fuel supply pipe 121. It should be noted that the pump module 120 is provided with a fuel sender gauge 514 that detects a liquid level of the fuel stored in the fuel tank 100 in accordance with a position of a float 514*a* floating on the fuel stored in the fuel tank 100.

Further, as shown on a right side of FIG. 1, the fuel tank 100 is fitted with a fuel inlet pipe 130. A refueling port 130*a* located at a tip of this fuel inlet pipe 130 is accommodated in a fuel inlet box 132 provided on a body of the vehicle. It should be noted that the fuel inlet pipe 130 is provided with a circulation pipe 131 that connects an upper portion of the fuel tank 100 and an upstream portion of the fuel inlet pipe 130 to each other.

The fuel inlet box 132 is provided with a fuel lid 133. In refueling, it becomes possible to pour fuel into the fuel tank 100 from the refueling port 130*a* by opening this fuel lid 133 and removing a cap 130*b* fitted to the refueling port 130*a*.

As shown in an upper region of FIG. 1, an intake passage 20 of the internal combustion engine 10 is provided with the fuel injection valve 11, which injects the fuel supplied from the fuel tank 100. Besides, the intake passage 20 is provided, in an inlet region thereof, with an air filter 21 that removes fine dust and the like contained in intake air.

The intake passage 20 is provided, in a region thereof upstream of a surge tank 22, with a throttle valve 24 whose opening degree is adjusted by a motor 23 and which regulates an amount of intake air in the internal combustion engine 10. Further, the intake passage 20 is provided, in a region thereof upstream of the throttle valve 24, with an airflow meter 51 that detects an amount of intake air.

As shown at a center of FIG. 1, the intake passage 20 of the internal combustion engine 10 has connected thereto a fuel vapor recovery device 200 that treats the fuel vapor generated in the fuel tank 100. The fuel vapor recovery device 200 is equipped with a canister 210 that has built therein an adsorbent 211 for adsorbing fuel vapor. It should be noted that the adsorbent 211 is activated charcoal for adsorbing fuel.

The canister 210 is connected to an upper portion of the fuel tank 100 via an exhaust passage 220 as a pipe connecting the canister 210 and the fuel tank 100 to each other. As shown in FIG. 1, the exhaust passage 220 is provided, at a midway position thereof, with a closure valve unit 221. The closure valve unit 221 is equipped with a relief valve 221*a* that opens when a difference in pressure between those regions of the exhaust passage 220 which are located upstream and downstream of the closure valve unit 221 respectively becomes very large, and a closure valve 221*b* that opens/closes a passage bypassing this relief valve 221*a*. It should be noted that the closure valve 221*b* is an electromagnetically driven valve that is changed over between an open-valve state thereof and a closed-valve state thereof on the basis of a control command of an electronic control unit 500.

The exhaust passage 220 is provided with this closure valve unit 221. Thus, when the closure valve 221*b* is closed, the exhaust passage 220 is closed by the relief valve 221*a* and the closure valve 221*b*.

As shown in the lower region of FIG. 1, an inlet region of the exhaust passage 220 in the fuel tank 100 is provided with an on-board refueling vapor recovery (ORVR) valve 222 and a rollover valve 223.

Due to a rise in the liquid level of fuel resulting from refueling, the ORVR valve 222 opens when the pressure in the fuel tank 100 rises. Thus, when the closure valve 221*b* is open, fuel vapor in the fuel tank 100 is introduced into the canister 210 through the exhaust passage 220 in response to a rise in the pressure in the fuel tank 100 resulting from a rise in liquid level. Accordingly, the rise in pressure resulting from the rise in liquid level is suppressed, and fuel vapor is restrained from being discharged to the atmosphere through the fuel inlet pipe 130 and the circulation pipe 131 during refueling.

On the other hand, when the vehicle is greatly inclined, the rollover valve 223 is closed to restrain liquid fuel from leaking out from the fuel tank 100. Fuel vapor in the fuel tank 100 is introduced into the canister 210 through the exhaust passage 220 when at least one of the relief valve 221*a* and the closure valve 221*b* is open and at least one of the ORVR valve 222 and the rollover valve 223 is open. The fuel vapor introduced into the canister 210 is then adsorbed by the adsorbent 211.

Further, the canister 210 has connected thereto an atmosphere introduction passage 230 communicating with a fuel inlet box 132 provided on the body of the vehicle. This atmosphere introduction passage 230 is provided, at a midway position thereof, with an air filter 231. It should be noted that the atmosphere introduction passage 230 is provided, in a region thereof downstream of the air filter 231, with a negative pressure pump unit 232 having a function of making a changeover between a state in which the atmosphere introduction passage 230 is closed and a state in which the canister 210 and the fuel inlet box 132 are made to communicate with each other without closing the atmosphere introduction passage 230.

Furthermore, the canister 210 has connected thereto a purge passage 240 communicating with the intake passage 20. As shown in FIG. 1, the purge passage 240 is provided, at a midway position thereof, with a purge control valve 241 that is changed over between an open-valve state thereof and a closed-valve state thereof on the basis of a command from the electronic control unit 500.

The electronic control unit 500, which comprehensively controls the vehicle, has connected thereto various sensors such as an accelerator position sensor 511 that detects an amount of operation of an accelerator by a driver, a crank position sensor 512 that detects an engine rotational speed, and the like, as well as the aforementioned airflow meter 510, the aforementioned pressure sensor 513, and the aforementioned fuel sender gauge 514.

On the basis of signals output from these various sensors, the electronic control unit 500 outputs control commands to respective portions, thus comprehensively controlling respective portions of the vehicle including the fuel vapor recovery device 200. For example, during the operation of the engine, the electronic control unit 500 controls the motor 23 on the basis of an engine rotational speed detected by the crank position sensor 512 and an accelerator operation amount detected by the accelerator position sensor 511, thereby driving the throttle valve 24 to regulate the amount of intake air. Further, the electronic control unit 500 controls the open-valve period of the fuel injection valve 11 in accordance with the amount of intake air, thereby controlling the amount of fuel injection.

Furthermore, during the operation of the engine, the electronic control unit 500 carries out purge by controlling the fuel vapor recovery device 200 to desorb the fuel adsorbed by the adsorbent 211 of the canister 210 and introduce the desorbed fuel into the intake passage 20 together with air.

More specifically, during the operation of the engine, the electronic control unit 500 opens the purge control valve 241 to suck out air in the canister 210 to the intake passage 20 through the purge passage 240 by means of a negative pressure in the intake passage 20.

Then, at this moment, the electronic control unit 500 changes over the negative pressure pump unit 232 to the state in which the canister 210 and the fuel inlet box 132 are made to communicate with each other without closing the atmosphere introduction passage 230, thus introducing air into the canister 210 through the atmosphere introduction passage 230. Thus, the fuel adsorbed by the adsorbent 211 is desorbed. The desorbed fuel is introduced into the intake passage 20 together with air through the purge passage 240.

By appropriately carrying out this purge during the operation of the engine, the fuel adsorbed by the adsorbent 211 is desorbed from the adsorbent 211. Therefore, the adsorbent 211 can be restrained from being saturated. Further, the desorbed fuel is introduced into the intake passage 20 together with air and burned in the internal combustion engine 10. Therefore, the fuel vapor generated in the fuel tank 100 can be removed through combustion without being discharged to the atmosphere.

It should be noted that the closure valve 221*b* is closed to close the exhaust passage 220 during the stoppage of the engine except during refueling, in the fuel vapor recovery device 200 according to this embodiment of the invention. Thus, the fuel tank 100 is basically sealed up during the stoppage of the engine. No fuel vapor is introduced into the canister 210 unless the pressure in the fuel tank 100 exceeds a pressure at which the relief valve 221*a* opens.

Thus, fuel vapor is adsorbed by the adsorbent 211 of the canister 210 during the stoppage of the engine, namely, during the absence of purge. As a result, the adsorbent 211 can be restrained from being saturated. Further, by thus sealing up the fuel tank 100 during the stoppage of the engine, the fuel that cannot be adsorbed by the adsorbent 211 can be restrained from directly flowing through the canister 210 to be discharged to the atmosphere.

However, while the fuel tank 100 is sealed up, the fuel vapor generated in the fuel tank 100 has no place to flow to. Therefore, the pressure in the fuel tank 100 rises in the course of generation of fuel vapor.

When the cap 130*b* is removed to open the refueling port 130*a* with the pressure in the fuel tank 100 higher than an atmospheric pressure, fuel vapor in the fuel tank 100 is discharged to the atmosphere through the fuel inlet pipe 130. Thus, in the fuel vapor recovery device 200 according to this embodiment of the invention, at the time of refueling, the closure valve 221*b* is first opened to introduce fuel vapor in the fuel tank 100 into the canister 210 through the exhaust passage 220, thereby reducing the pressure in the fuel tank 100. Then, after confirming a sufficient fall in the pressure in the fuel tank 100 on the basis of the pressure in the fuel tank 100, which is detected by the pressure sensor 513, the fuel lid 133 is unlocked.

By unlocking the fuel lid 133 after confirming a sufficient fall in the pressure in the fuel tank 100 as described above, fuel vapor in the fuel tank 100 can be restrained from being discharged to the atmosphere through the fuel inlet pipe 130 when the refueling port 130*a* is opened.

From the standpoint of promoting the desorption of fuel from the adsorbent 211, it is desirable to warm the adsorbent 211 while purge is carried out. Thus, in the vehicular fuel vapor recovery device described in Japanese Patent Application Publication No. 8-230493 (JP-A-8-230493), the canister 210 is arranged in the space surrounded by the exhaust pipe and the side member and the cross member, which constitute the frame of the vehicle, and the adsorbent 211 is warmed with the aid of the heat of the exhaust gas flowing through the exhaust pipe.

The adoption of this construction makes it possible to warm the adsorbent 211 with the aid of the heat of the exhaust gas flowing through the exhaust pipe and promote the desorption of fuel from the adsorbent 211. However, the fuel tank 100 and the canister 210 are connected to each other via the exhaust passage 220. Therefore, in the case where the canister 210 is arranged close to the exhaust pipe to warm the adsorbent 211 built in the canister 210 with the aid of the heat of the exhaust gas flowing through the exhaust pipe as described above, the fuel tank 100 and the exhaust pipe are arranged relatively close to each other. When the fuel tank 100 is arranged close to the exhaust pipe, the fuel tank 100 is warmed by the heat of the exhaust gas flowing through the exhaust pipe. When the fuel tank 100 is warmed and the temperature of the fuel stored in the fuel tank 100 rises, fuel vigorously vaporizes in the fuel tank 100, so that a large amount of fuel is adsorbed by the adsorbent 211. As a result, the adsorbent 211 is likely to be saturated, and the fuel vapor that cannot be adsorbed by the adsorbent 211 directly flows through the canister 210 to be discharged to the atmosphere from the atmosphere introduction passage 230.

It should be noted that the adsorbent 211 can also be restrained from being saturated by providing the canister 210 equipped with the large-capacity adsorbent 211. However, in the case where such a construction is adopted, the canister

210 is increased in size and hence leads to an increase in the size of the fuel vapor recovery device 200.

Thus, in order to effectively restrain fuel vapor from being discharged to the atmosphere while suppressing the increase in the size of the canister 210, it is desirable to restrain the fuel tank 100 from being warmed by the heat of the exhaust gas flowing through the exhaust pipe.

It should be noted that the fuel tank 100 can also be restrained from being warmed while warming the canister 210, by arranging the fuel tank 100 at a distance from the exhaust pipe while arranging the canister 210 close to the exhaust pipe. However, in the case where this construction is adopted, the exhaust passage 220, which connects the fuel tank 100 and the canister 210 to each other, is long.

Further, the space in which this fuel tank 100 and this exhaust pipe can be arranged is limited. In some cases, therefore, a sufficient distance cannot be ensured between the fuel tank 100 and the exhaust pipe.

Thus, the vehicle according to this embodiment of the invention adopts an arrangement structure in which the arrangement position of the canister 210 is set such that the fuel tank 100 can be restrained from being warmed by the heat of the exhaust gas flowing through the exhaust pipe while warming the canister 210 with the aid of the heat of the exhaust gas flowing through the exhaust pipe.

The arrangement structure of the canister 210 according to this embodiment of the invention will be described hereinafter with reference to FIGS. 2 and 3. It should be noted that FIG. 2 is a schematic view showing the arrangement position of the canister 210 in the fuel vapor recovery device 200 according to this embodiment of the invention, illustrating a rear region of the vehicle. Further, FIG. 3 is an enlarged view showing a region surrounded by broken lines of FIG. 2 on an enlarged scale.

Figure 2:
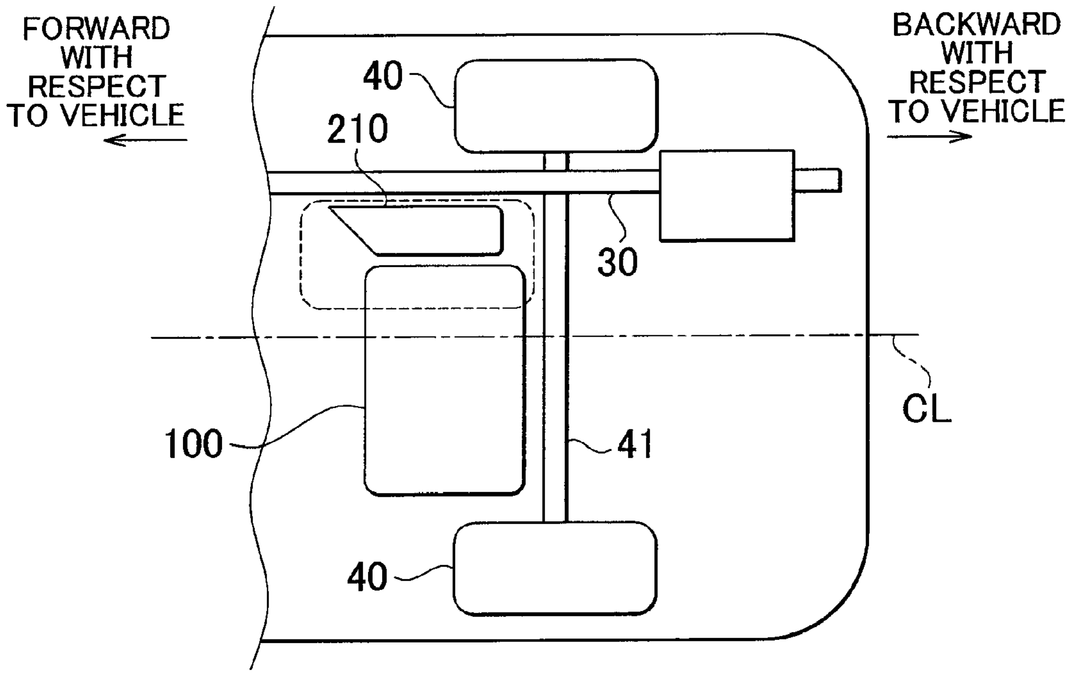
FIG. 2 is a schematic view showing an arrangement position of a canister in the fuel vapor recovery device according to the first embodiment of the invention.

As shown in FIG. 2, in the vehicle according to this embodiment of the invention, the fuel tank 100 is arranged in a region in front of an axle 41, to which a right wheel 40 and a left wheel 40 are coupled, with respect to the vehicle. It should be noted that as is apparent from comparison with the position of a centerline CL dividing the vehicle into halves in a vehicle width direction as indicated by alternate long and short dash lines in FIG. 2, the fuel tank 100 is arranged in the vicinity of the center of the vehicle in the vehicle width direction.

An exhaust pipe 30 that introduces to the rear region of the vehicle the exhaust gas discharged from the internal combustion engine 10 (not shown) arranged in a front region of the vehicle is arranged at a position biased toward one side in the vehicle width direction of the vehicle as shown in an upper region of FIG. 2. In the vehicle according to this embodiment of the invention, as shown in FIG. 2, the canister 210 is arranged between the exhaust pipe 30 and the fuel tank 100.

Figure 3:
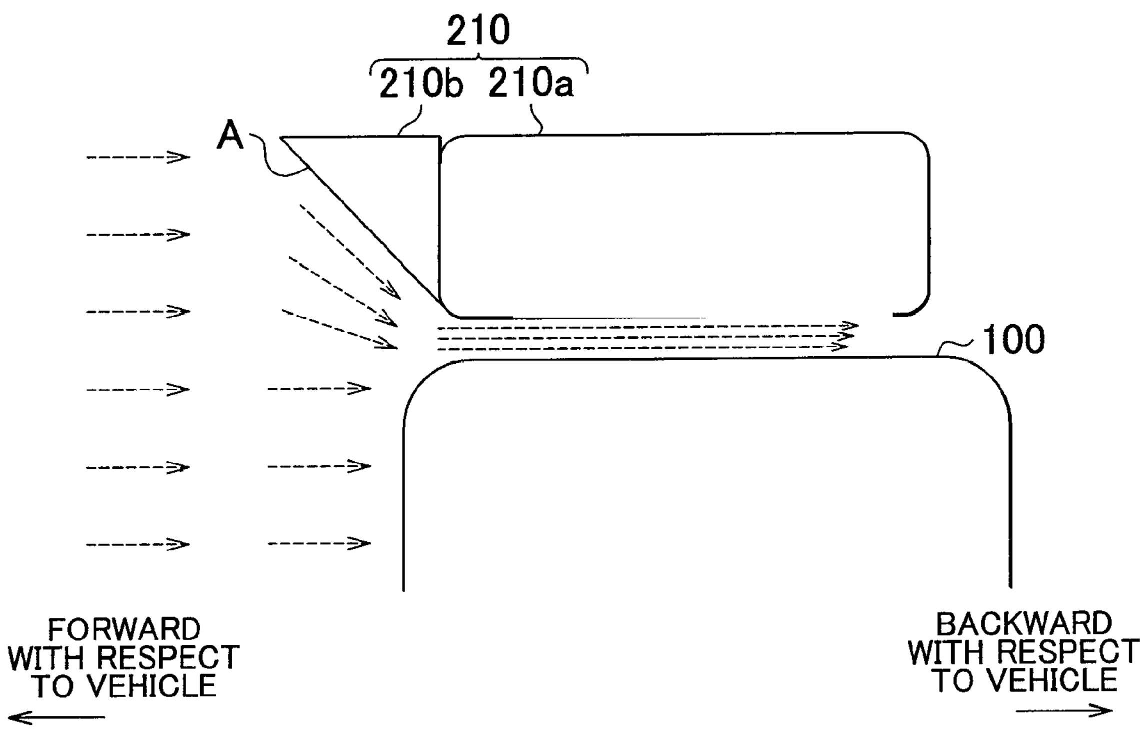
FIG. 3 is an enlarged view showing the neighborhood of the canister of FIG. 2 on an enlarged scale.

As shown in FIG. 3, in the canister 210 according to this embodiment of the invention, a rectification member **210*b* is fixed to that region of a canister body 210*a* which is located on a vehicle front side. As shown in FIG. 3, the rectification member 210*b*** has an inclined lateral wall A located on the vehicle front side.

The canister 210 fitted with this rectification member **210*b* is arranged such that the lateral wall A is so inclined as to gradually approach the fuel tank 100** from the vehicle front side toward a vehicle rear side.

As described above, that region of the canister 210 which is located on the vehicle front side (the lateral wall A) is so inclined as to gradually approach the fuel tank 100 side from the vehicle front side toward the vehicle rear side. Thus, when the vehicle moves forward, the wind blowing against the vehicle from the vehicle front side to the vehicle rear side is introduced to the fuel tank 100 side along the lateral wall A as indicated by broken arrows.

According to the first embodiment of the invention described above, the following effects are obtained. (1) As shown in FIG. 2, the canister 210 is arranged between the exhaust pipe 30 and the fuel tank 100. Therefore, the heat radiated from the exhaust pipe 30 and the heat transferred from the exhaust pipe 30 side via air are blocked by the canister 210. Thus, the fuel tank 100 can be restrained from being warmed by the heat of the exhaust gas flowing through the exhaust pipe 30. Further, the canister 210 is warmed by the heat radiated from the exhaust pipe 30 and the heat transferred from the exhaust pipe 30 side via air.

Accordingly, the fuel tank 100 can be restrained from being warmed by the heat of the exhaust gas flowing through the exhaust pipe 30, while warming the adsorbent 211 built in the canister 210 with the aid of the heat of the exhaust gas flowing through the exhaust pipe 30.

(2) When the vehicle moves forward, the wind blowing against the vehicle from the vehicle front side to the vehicle rear side is introduced to the fuel tank 100 side by the rectification member **210*b*. Therefore, the amount and flow velocity of the air coming into contact with the fuel tank 100 can be increased. Thus, the heat exchange between the fuel tank 100 and the air coming into contact with the fuel tank 100 can be promoted, and the fuel tank 100** can be effectively cooled by the wind blowing against the vehicle.

Accordingly, the generation of fuel vapor in the fuel tank 100 can be suppressed, and the adsorbent 211 built in the canister 210 can be effectively restrained from being saturated.

(3) In the fuel vapor recovery device 200 to which the canister arrangement structure according to the first embodiment of the invention is applied, the amount of the fuel vapor generated in the fuel tank 100 can be reduced as described above, and fuel can be efficiently desorbed from the adsorbent 211 built in the canister 210. Thus, the adsorbent 211 can be effectively restrained from being saturated, and fuel vapor can be restrained from being discharged to the atmosphere without providing the large canister 210.

Further, the fuel tank 100 can be restrained from being warmed, without arranging the canister 210 at a distance from the fuel tank 100. Therefore, a pipeline connecting the canister 210 and the fuel tank 100 to each other, namely, the exhaust passage 220 can be restrained from becoming long as well.

(4) According to the vehicle equipped with the fuel vapor recovery device 200 to which the canister arrangement structure according to the first embodiment of the invention is applied, the amount of the fuel vapor generated in the fuel tank 100 can be reduced, and fuel can be efficiently desorbed from the adsorbent 211 of the canister 210. Further, the fuel tank 100 can be restrained from being warmed, without arranging the canister 210 at a distance from the fuel tank 100. Thus, even in the case where the space for arranging the canister 210 and the fuel tank 100 is limited, it is possible to realize a construction capable of restraining the fuel tank 100 from being warmed while warming the canister 210.

It should be noted that the foregoing first embodiment of the invention can also be carried out in the following modes obtained through appropriate modification thereof. The foregoing embodiment of the invention presents the construction in which the canister body **210*a* is provided, in the region thereof located on the vehicle front side, with the rectification member 210*b* to introduce to the fuel tank 100 side the wind blowing against the vehicle from the vehicle front side to the vehicle rear side when the vehicle moves forward. Meanwhile, it is also possible to adopt a construction in which the canister body 210***a* is provided, in a region thereof located on the vehicle rear side, with a rectification member to introduce to the fuel tank 100 side the wind blowing against the vehicle from the vehicle rear side to the vehicle front side when the vehicle moves backward. Further, it is also possible to adopt a construction in which the canister body 210*a* is provided, in the regions thereof located on the vehicle front side and the vehicle rear side, with rectification members respectively.

As a construction in which part of an outer peripheral face of the canister 210 is inclined to introduce to the fuel tank 100 side the wind blowing against the vehicle, it is also possible to adopt a construction in which the canister body 210*a* itself assumes a shape inclined in the same manner as the aforementioned rectification member 210*b* and the rectification member 210*b* is dispensed with, in addition to the construction in which the canister body 210*a* is fitted with the rectification member 210*b* as in the foregoing first embodiment of the invention.

Figure 4:
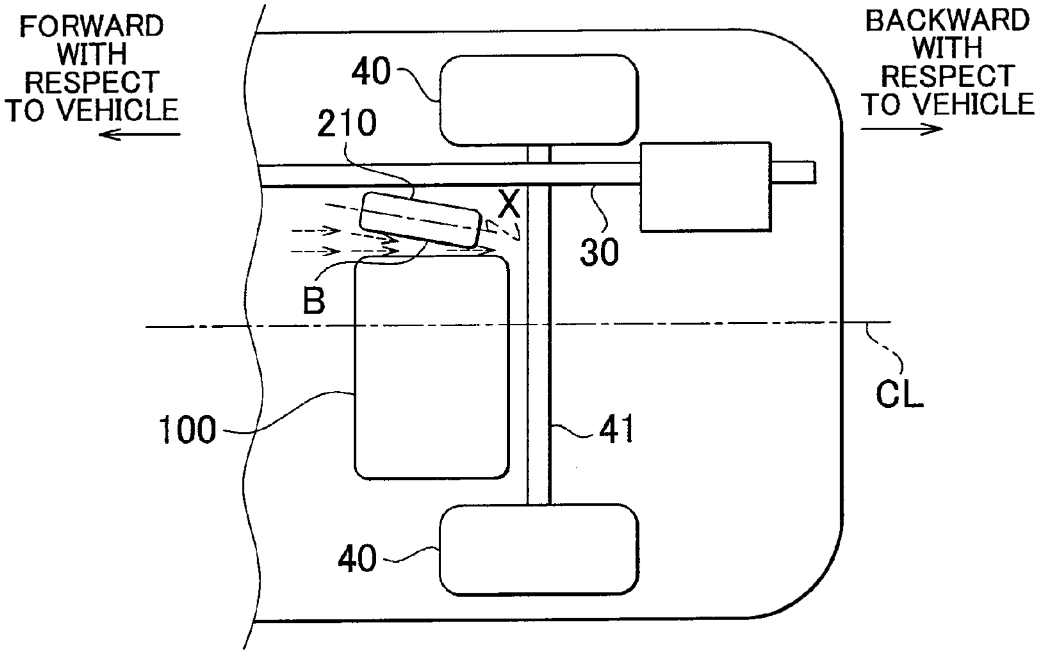
FIG. 4 is a schematic view showing an arrangement position of a canister according to a modification example of the first embodiment of the invention.

Further, as shown in FIG. 4, it is also appropriate to adopt a construction in which the canister 210 is arranged in an inclined manner such that a centerline X thereof is inclined with respect to the direction of an extension of the centerline CL of the vehicle, so that a longitudinally extending lateral wall B of the canister 210 is so inclined as to gradually approach the fuel tank 100 from the vehicle front side toward the vehicle rear side. In the case where this construction is adopted as well, the wind blowing against the vehicle is introduced to the fuel tank 100 side along the lateral wall B after having hit the lateral wall B, as indicated by the broken arrows in FIG. 4. As a result, an effect similar to that of the foregoing first embodiment of the invention can be obtained.

Second Embodiment

A second embodiment of the invention in which a canister arrangement structure according to this invention is embodied in a fuel vapor recovery device mounted on a vehicle will be described hereinafter with reference to FIGS. 5 and 6. It should be noted that FIG. 5 is a schematic view showing an arrangement position of the canister 210 in the fuel vapor recovery device 200 according to the second embodiment of the invention, and that FIG. 6 is a schematic view showing the exhaust pipe 30, the fuel tank 100, and the canister 210 according to this embodiment of the invention as viewed from a position beside the vehicle.

It should be noted that the vehicle according to the second embodiment of the invention is different from the vehicle according to the first embodiment of the invention in the arrangement mode of the exhaust pipe 30 and the arrangement mode of the canister 210. The fuel vapor recovery device 200 according to this embodiment of the invention is identical in basic construction to the fuel vapor recovery device 200 according to the first embodiment of the invention. Thus, for the convenience of explanation, components identical to those of the first embodiment of the invention are simply denoted by the same reference symbols respectively and will not described in detail below.

Figure 5:
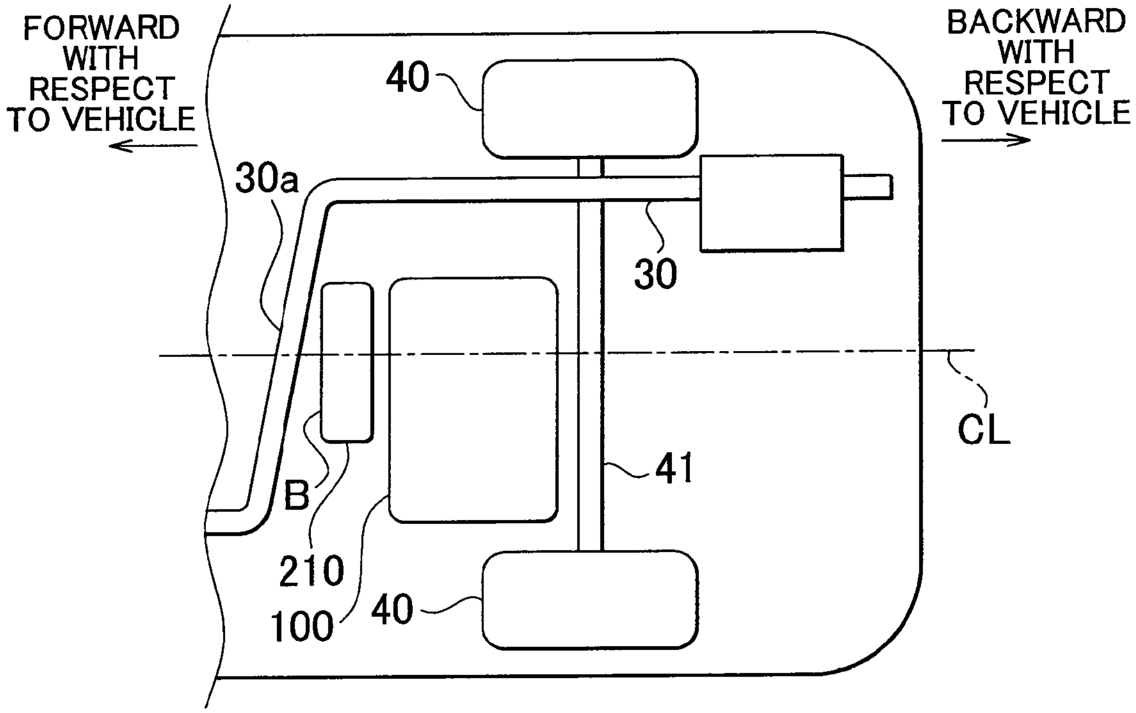
FIG. 5 is a schematic view showing an arrangement position of a canister in a fuel vapor recovery device according to the second embodiment of the invention.
Figure 6:
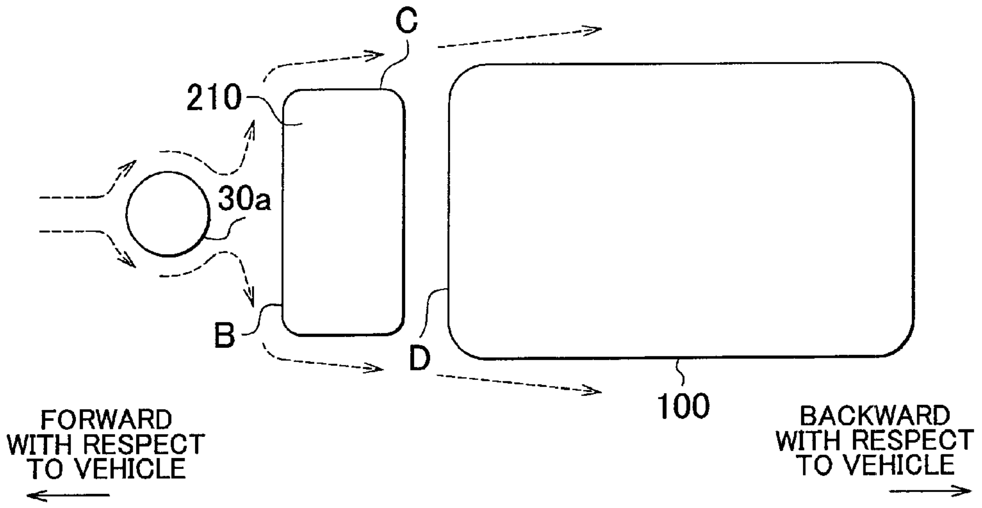
FIG. 6 is a schematic view showing an exhaust pipe, a fuel tank, and the canister according to the second embodiment of the invention as viewed from a position beside a vehicle.

As shown in FIG. 5, in the vehicle according to this embodiment of the invention, the exhaust pipe 30 is so arranged as to extend in the vehicle width direction in the region located on the vehicle front side with respect to the fuel tank 100. In the vehicle according to this embodiment of the invention, as shown in FIG. 5, the canister 210 is arranged between the fuel tank 100 and a region 30*a* of the exhaust pipe 30 which is arranged on the vehicle front side with respect to the fuel tank 100. Further, as shown in FIG. 6, the canister 210 is arranged such that the lateral wall B, which is largest in area among lateral walls of the canister 210, is directed forward with respect to the vehicle.

According to the second embodiment of the invention described above, the following operations and effects are obtained in addition to the effects (1), (3), and (4) in the foregoing first embodiment of the invention. (5) In the fuel vapor recovery device 200 mounted on the vehicle in which the exhaust pipe 30 is so arranged as to extend through a region on the vehicle front side with respect to the fuel tank 100, the wind blowing against the vehicle is warmed by passing around the region 30*a* of the exhaust pipe 30 which is located on the vehicle front side with respect to the fuel tank 100 when the vehicle moves forward.

On the other hand, in the second embodiment of the invention, the canister 210 is arranged between the fuel tank 100 and the region 30*a* of the exhaust pipe 30 which is arranged on the vehicle front side with respect to the fuel tank 100 as described above. Thus, the wind blowing against the vehicle is warmed by the heat of the exhaust gas flowing through the region 30*a* of the exhaust pipe 30 which is located on the vehicle front side with respect to the fuel tank 100, and hits the canister 210 arranged on the vehicle front side with respect to the fuel tank 100 as indicated by broken arrows in FIG. 6. Thus, the canister 210 can be warmed through heat exchange with the warmed wind blowing against the vehicle, and the adsorbent 211 built in the canister 210 can be effectively warmed.

Further, the warmed wind blowing against the vehicle is blocked by the canister 210 provided on the vehicle front side with respect to the fuel tank 100, and hence is unlikely to hit a lateral wall D of the fuel tank 100 which is located on the vehicle front side. Thus, the fuel tank 100 is unlikely to be warmed, and fuel is effectively restrained from vaporizing in the fuel tank 100.

(6) Further, in the foregoing second embodiment of the invention, the canister 210 is arranged such that the lateral wall B, which is largest in area among the lateral walls of the canister 210, is directed forward with respect to the vehicle. Thus, a vast range of the lateral wall D of the fuel tank 100 on the vehicle front side can be blocked from the warmed wind blowing against the vehicle, and the fuel tank 100 can be effectively restrained from being warmed by the warmed wind blowing against the vehicle.

It should be noted that the foregoing second embodiment of the invention can also be carried out in the following modes obtained through appropriate modification thereof. The foregoing second embodiment of the invention presents the construction in which the canister 210 is arranged such that the lateral wall B, which is largest in area among the lateral walls of the canister 210, is directed forward with respect to the vehicle. Meanwhile, when the canister 210 is arranged between the fuel tank 100 and the region 30*a* of the exhaust pipe 30 which is located on the vehicle front side with respect to the fuel tank 100, the warmed air can be blocked by the canister 210.

Figure 7:
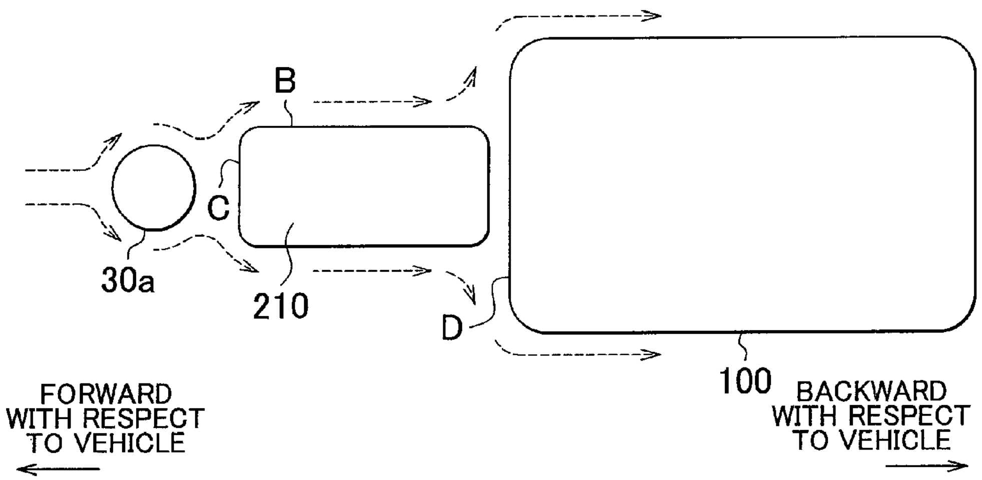
FIG. 7 is a schematic view showing an arrangement mode of a canister in a fuel vapor recovery device according to a modification example of the second embodiment of the invention.

Thus, instead of the construction in which the canister 210 is arranged such that the lateral wall B, which is largest in area among the lateral walls of the canister 210, is directed forward with respect to the vehicle as in the foregoing second embodiment of the invention, it is also possible to adopt a construction in which the canister 210 is arranged such that a lateral wall C, which is smaller in area than the lateral wall B, is directed forward with respect to the vehicle as shown in FIG. 7. Even in the case where this construction is adopted, the warmed wind blowing against the vehicle can be blocked by the canister 210, and the fuel tank 100 can be restrained from being warmed.

However, from the standpoint of suppressing the generation of fuel vapor by blocking the warmed wind blowing against the vehicle by the canister 210 and thus restraining the fuel tank 100 from being warmed, it is desirable to widen, to the maximum possible extent, the range over which the warmed air can be blocked. Thus, from the standpoint of suppressing the generation of fuel vapor, it is desirable to adopt the construction in which the canister 210 is arranged such that the lateral wall B, which is largest in area among the lateral walls of the canister 210, is directed forward with respect to the vehicle as in the foregoing second embodiment of the invention.

Besides, in common with the foregoing respective embodiments of the invention, the following elements can be changed. In order to restrain the fuel tank 100 from being warmed by the heat radiated from the exhaust pipe 30 or the heat transferred from the exhaust pipe 30 side via air, it is also conceivable to provide a partition wall as a heat shield plate between the exhaust pipe 30 and the fuel tank 100. On the other hand, when the canister 210 is arranged between the exhaust pipe 30 and the fuel tank 100 as in the foregoing embodiments of the invention, the partition wall can be dispensed with or reduced in size.

Thus, the canister arrangement structure according to the invention is also applicable to a vehicle in which a partition wall as a heat shield plate is provided between the exhaust pipe 30 and the fuel tank 100. When the canister arrangement structure according to the invention is applied to a vehicle equipped with this partition wall, the cost increase resulting from the provision of the partition wall can be suppressed.

As described above, when the canister 210 is provided between the exhaust pipe 30 and the fuel tank 100, the heat radiated from the exhaust pipe 30 and the heat transferred from the exhaust pipe 30 side via air can be blocked by the canister 210. Therefore, the fuel tank 100 can be restrained from being warmed. Further, the canister 210 can be warmed with the aid of the heat radiated from the exhaust pipe 30 and the heat transferred from the exhaust pipe 30 side via air.

That is, the arrangement position of the canister 210 is not limited to the positions exemplified in the foregoing respective embodiments of the invention. As long as a construction in which the canister 210 is provided between the exhaust pipe 30 and the fuel tank 100 is adopted, the arrangement position of the canister 210 can be appropriately changed.

Further, although the fuel vapor recovery device 200 equipped with the single canister 210 is presented in each of the foregoing embodiments of the invention, the invention is also applicable to an fuel vapor recovery device equipped with a plurality of canisters 210.

It should be noted that each of the foregoing embodiments of the invention presents the example in which the canister arrangement structure according to the invention is applied to the fuel vapor recovery device mounted on the vehicle. However, the canister arrangement structure according to the invention is not exclusively applied to a fuel vapor recovery device mounted on a vehicle. Thus, the canister arrangement structure according to the invention is also applicable to a fuel vapor recovery device for a marine internal combustion engine, a fuel vapor recovery device for an internal combustion engine for power generation, and the like.

Further, the constructions of the fuel tank 100 and the fuel vapor recovery device 200 illustrated in each of the foregoing embodiments of the invention are just examples of the invention. The construction of the fuel tank 100 and the construction of the fuel vapor recovery device 200 can be appropriately changed.

The respective embodiments of the invention will be summarized hereinafter.

An aspect of the invention relates to a canister arrangement structure in a fuel vapor recovery device. The fuel vapor recovery device is equipped with a canister that has built therein an adsorbent for adsorbing fuel and temporarily collects fuel vapor generated in a fuel tank of an internal combustion engine. In this canister arrangement structure, the canister is arranged between an exhaust pipe of the internal combustion engine and the fuel tank.

An aspect of the invention relates a fuel vapor recovery device for an internal combustion engine. The fuel vapor recovery device includes an exhaust pipe of the internal combustion engine, a fuel tank of the internal combustion engine and a canister that has built therein an adsorbent for adsorbing fuel and temporarily collects fuel vapor generated in the fuel tank. The canister is arranged between the exhaust pipe and the fuel tank.

The aforementioned canister arrangement structure in the fuel vapor recovery device mounted on a vehicle may be designed as follows. That is, the canister may be arranged such that part of an outer peripheral face of the canister is so inclined as to introduce to the fuel tank side a wind blowing against the vehicle.

According to the aforementioned construction, the amount and flow velocity of the air coming into contact with the fuel tank can be increased by introducing to the fuel tank side the wind blowing against the vehicle. Thus, the heat exchange between the fuel tank and the air coming into contact with the fuel tank is promoted, and the fuel tank can be effectively cooled by the wind blowing against the vehicle. Thus, the generation of fuel vapor in the fuel tank can be suppressed, and the adsorbent built in the canister can be effectively restrained from being saturated.

It should be noted that, more specifically, the canister may be provided with a rectification member, and may be arranged such that the rectification member, which is fixed to a canister body, introduces to the fuel tank side the wind blowing against the vehicle. Further, the canister may be provided with a rectification member, and may be arranged in an inclined manner such that the rectification member gradually approaches the fuel tank from a front side of the vehicle toward a rear side of the vehicle. Further, the canister may be so arranged as to be inclined with respect to a direction of an extension of a centerline dividing the vehicle into halves in a vehicle width direction, such that part of an outer peripheral face of the canister gradually approaches the fuel tank from the front side of the vehicle toward the rear side of the vehicle. In this manner, it is possible to realize a construction in which the wind blowing against the vehicle from a region in front of the vehicle toward a region behind the vehicle is introduced to the fuel tank side when the vehicle moves forward.

For example, the canister may be so arranged as to be inclined with respect to the direction of the extension of the centerline dividing the vehicle into halves in the vehicle width direction, such that a longitudinally extending lateral wall of the canister is so inclined as to gradually approach the fuel tank from the front side of the vehicle toward the rear side of the vehicle.

Further, in a fuel vapor recovery device mounted on a vehicle in which an exhaust pipe extends through an area in front of a fuel tank with respect to the vehicle, the wind blowing against the vehicle is warmed by passing around the exhaust pipe and then hits the fuel tank when the vehicle moves forward.

Thus, in the fuel vapor recovery device mounted on the vehicle in which the exhaust pipe extends through the area forward of the fuel tank with respect to the vehicle, the canister may be arranged between the fuel tank and that region of the exhaust pipe which is arranged forward of the fuel tank with respect to the vehicle. When this construction is adopted, the wind blowing against the vehicle is warmed by the heat of the exhaust gas flowing through the exhaust pipe, and then hits the canister arranged forward of the fuel tank with respect to the vehicle. As a result, the canister can be warmed through heat exchange with the warmed wind blowing against the vehicle, and the adsorbent can be warmed.

Further, the warmed wind blowing against the vehicle is blocked by the canister provided in front of the fuel tank with respect to the vehicle, and hence is unlikely to hit the fuel tank. Thus, the fuel tank is unlikely to be warmed, and the vaporization of fuel in the fuel tank is effectively suppressed.

It should be noted that, in order to restrain the wind blowing against the vehicle from hitting the fuel tank after passing around the exhaust pipe to be warmed, the canister may be arranged such that that region of the outer peripheral face of the canister which is largest in area is directed forward with respect to the vehicle. When this construction is adopted, a wider range of the fuel tank can be blocked by the warmed wind blowing against the vehicle, and the fuel tank can be effectively restrained from being warmed by the wind blowing against the vehicle, which has been warmed by the heat of the exhaust gas flowing through the exhaust pipe.

The canister may be arranged according to the aforementioned canister arrangement structure to construct the fuel vapor recovery device. According to the fuel vapor recovery device having the canister arranged according to the aforementioned arrangement structure, the amount of the fuel vapor generated in the fuel tank can be reduced, and fuel can be efficiently desorbed from the adsorbent built in the canister. Thus, the adsorbent can be effectively restrained from being saturated, and fuel vapor can be restrained from being discharged to the atmosphere without providing a large canister.

Further, the fuel tank can be restrained from being warmed, without arranging the canister at a distance from the fuel tank. Therefore, a pipeline connecting the canister and the fuel tank to each other can be restrained from becoming long as well.

Further, a vehicle may be constructed with the aforementioned fuel vapor recovery device. According to the vehicle equipped with the aforementioned fuel vapor recovery device, the amount of the fuel vapor generated in the fuel tank can be reduced, and fuel can be efficiently desorbed from the adsorbent built in the canister. Thus, the adsorbent can be effectively restrained from being saturated, and fuel vapor can be restrained from being discharged to the atmosphere, without providing a large canister.

Further, the fuel tank can be restrained from being warmed without arranging the canister at a distance from the fuel tank. Therefore, even in the case where the space for arranging the canister and the fuel tank is limited, it is possible to realize a construction in which the fuel tank can be restrained from being warmed while warming the canister.

While the invention has been described with reference to the example embodiments thereof, it is to be understood that the invention is not limited to the described embodiments or constructions. The invention is intended to cover various modifications and equivalent arrangements. In addition, while the various elements of the disclosed invention are shown in various example combinations and configurations, other combinations and configurations, including more, less or only a single element, are also within the scope of the appended claims.

What is claimed is:

1. A canister arrangement structure in a fuel vapor recovery device mounted on a vehicle, comprising:

a canister that has built therein an adsorbent for adsorbing fuel and that temporarily collects fuel vapor generated in a fuel tank of an internal combustion engine, an exhaust pipe, wherein an exhaust gas discharged from the internal combustion engine flows through the exhaust pipe, wherein the canister arrangement structure is in the fuel vapor recovery device mounted on the vehicle having the exhaust pipe so arranged as to extend in a vehicle width direction through an area forward of the fuel tank with respect to the vehicle, and wherein the canister is arranged between the fuel tank and that region of the exhaust pipe which is arranged forward of the fuel tank with respect to the vehicle.

2. The canister arrangement structure according to claim 1, wherein the canister is arranged such that a region of the outer peripheral face of the canister which is largest in area is directed forward with respect to the vehicle.

3. A fuel vapor recovery device for an internal combustion engine, comprising:

an exhaust pipe, wherein an exhaust gas discharged from the internal combustion engine flows through the exhaust pipe;

a fuel tank of the internal combustion engine; and a canister that has built therein an adsorbent for adsorbing fuel and temporarily collects fuel vapor generated in the fuel tank, wherein the canister arrangement structure is in the fuel vapor recovery device mounted on a vehicle having the exhaust pipe so arranged as to extend in a vehicle width direction through an area forward of the fuel tank with respect to the vehicle, and the canister is arranged between the fuel tank and that region of the exhaust pipe which is arranged forward of the fuel tank with respect to the vehicle.

* * * * *